United States Patent [19]

Crawford et al.

[11] 4,170,484

[45] Oct. 9, 1979

[54] BITUMINOUS-EMULSION MINERAL AGGREGATE COMPOSITIONS

[75] Inventors: Wheeler C. Crawford, Houston; James R. Wilson, Missouri City, both of Tex.

[73] Assignee: Texaco Inc., White Plains, N.Y.

[21] Appl. No.: 895,698

[22] Filed: Apr. 12, 1978

[51] Int. Cl.² ............................................. C08L 95/00
[52] U.S. Cl. .............................. 106/281 N; 106/277; 106/281 R; 106/283; 106/287.11
[58] Field of Search ............... 106/277, 281 R, 281 N, 106/283, 287 SB

[56] References Cited

U.S. PATENT DOCUMENTS

| 2,570,185 | 4/1947 | Aldrich | 106/281 N |
|---|---|---|---|
| 2,760,878 | 8/1956 | Lhorty | 106/283 |
| 3,978,927 | 9/1976 | Kudchadker et al. | 166/274 |
| 4,036,661 | 7/1977 | Schmidt | 106/277 |
| 4,043,396 | 8/1977 | Kudchadker et al. | 166/274 |

Primary Examiner—J. Ziegler
Attorney, Agent, or Firm—Carl G. Ries; Thomas H. Whaley; Walter D. Hunter

[57] ABSTRACT

Surfacing compositions are provided which comprise a mixture of mineral aggregate, such as particulate slag, the residuum of a bituminous emulsion and optionally, a silane adhesion promoter. In the emulsion, the emulsifier employed is an alkoxylated asphalt.

7 Claims, No Drawings

BITUMINOUS-EMULSION MINERAL AGGREGATE COMPOSITIONS

BACKGROUND OF THE INVENTION

1. Field of the Invention

This invention relates to bituminous surfacing compositions and more particularly to compositions for use in paving construction, which compositions utilize bituminous emulsions prepared using an alkoxylated asphalt as the emulsifying agent.

2. Description of the Prior Art

Bitumen or asphalt is widely used for many applications with paving and surface coating possibly being the most extensive. While asphalt may be applied by different methods, there has been an increasing shift the emulsions, both cationic and anionic to replace cutbacks and hot asphalt in many applications. Cationic emulsions are obtained by dispersing fine asphalt particles in a continuous water phase by use of cationic emulsifiers. The emulsion particles carry a positive charge and readily deposit or coat the aggregate which is generally negatively charged. The rate of asphalt deposition may be varied somewhat by the emulsifier and emulsion formulation used but is relatively rapid compared to anionic emulsions which depend more upon evaporation of water for their deposition. In unstabilized emulsions, the deposition of asphalt may take place immediately upon contact with the aggregate which usually results in the asphalt being deposited upon the aggregate in large droplets without the aggregate being completely or uniformaly coated. Stabilizers are often added to the emulsions to control the set to permit substantially uniform and complete coating of the aggregate with a continuous asphalt film.

The use of spent sulfite liquor or lignosulfonate as an anionic asphalt emulsifier, as well as the use of ammonium lignosulfonate have been disclosed in U.S. Pat. Nos. 2,332,542 and 2,494,708. Calcium lignosulfonate in U.S. Pat. No. 2,978,342 has been suggested as an antistripping agent for use in hot asphalt applications to enhance the coating and bonding of the hot asphalt to wet aggregate such that it will not readily be displaced or stripped from the aggregate upon being subjected to water. However, in cationic asphalt emulsions, spent sulfite liquor or lignosulfonate is not sufficiently compatible or effective as a stabilizer to be used to any extent. The reaction of alkali lignins with primary and secondary amines and formaldehyde in the Mannich-type reaction has been disclosed for the preparation of a cationic asphalt emulsifier in U.S. Pat. No. 3,126,350 as well as disclosure made in U.S. Pat. No. 3,718,639 that lignin base asphalt emulsion additives may be obtained by reacting alkali lignin with a tertiary amineepichlorohydrin intermediate condensation product. The latter processes involve costly processing and a stabilizer which could be prepared more simply from lignin is greatly desired.

It is an object of this invention to provide a bituminous emulsion and a bituminous emulsion-mineral aggregate composition wherein in the said emulsion, the emulsifier is an alkoxylated asphalt.

SUMMARY OF THE INVENTION

In brief, the surfacing composition of this invention comprise:

(a) a mineral aggregate such as particulate slag, (b) the residuum of a bituminous emulsion comprising a bituminous binder, a water soluble alkoxylated asphalt emulsifier and water, and, optionally, (c) a silane adhesion promoter.

DETAILED DESCRIPTION OF THE INVENTION

The surfacing compositions of this invention comprise:

(a) 100 parts by weight of a mineral aggregate which is preferably particulate slag, (b) the residuum from 3 to 150 parts by weight of a bituminous emulsion comprising (1) about 40 to about 80 percent by weight of a bituminous binder, (2) from about 0.5 to about 10.0 percent by weight of a water soluble alkoxylated asphalt emulsifier, and (3) water to make 100 percent by weight of the emulsion. Optionally, the bituminous emulsion of this invention may contain from about 0.001 to about 1.0 weight percent of a silane adhesion promoter.

Although the particular mineral aggregates employed to form the bituminous surfacing compositions of this invention are not critical, an especially useful mineral aggregate is particulate slag, such as basic-oxygen-furnace slag. Other common aggregates such as crushed limestone, crushed rock, sand, gravel, etc. may be employed in preparing the bituminous surfacing composition of this invention.

Th bituminous emulsions employed in preparing the bituminous surfacing compositions of this invention will contain from about 40 to about 85 percent, preferably from about 65 to about 80 percent by weight of a bituminous binder, from about 0.1 to about 10.0 percent and preferably from about 0.5 about 8 percent by weight of a watersoluble alkoxylated asphalt emulsifier and water to make 100 percent of the emulsion.

The general process of preparing the emulsions of this invention involves the controlled mixing of water, the water-soluble alkoxlated asphalt emulsifying agent and asphalt. Utilizing high shear action, the bitumen or asphalt is present as discrete particles dispersed in the water phase. This dispersion may be carried out by a number of methods well known in the art such as by the use of simple mixers, colloid mills, homogenizers, etc. The preparation of such emulsions is more completely described in U.S. Pat. Nos. 2,838,663 and 2,862,830. In the United States in the preparation of such emulsions the colloid mill is most commonly used. Such colloid mills consist of a revolving disk or rotor which fits closely to a stationary part known as the stator. When the asphalt, water and emulsifying agent are forced through the narrow clearance between the rotor and the stator, a dispersion is formed.

Many types of asphalts are useful in preparing the alkoxylated asphalts and the bituminous emulsions of this invention. The American Society for Testing and Materials defines asphalts as "A dark brown to black cementitious material, solid or semi-solid in consistency, in which the predominating constituents are bitumens which occur in nature as such or are obtained as residua in refining petroleum." Thus, asphalts occur naturally or may be obtained as residues in petroleum refining. The Kirk-Othmer Encyclopedia of Chemical Technology, Second Edition, Volume 2 at pages 762 to 789 discusses the general characteristics of various types of asphalts.

Petroleum derived asphalts may be further divided into straight reduced asphalts which are obtained in reduced pressure stills or precipitated with propane or butane. Also, asphalts may be obtained from the residues of cracking operations. Petroleum derived asphalts may also be of air blow variety.

Naturally occurring asphalts include gilsonite graphamite, glance pitch, Burmudez, rock asphalts and Trinidad.

Many other examples of both petroleum derived and natural asphalts could be given but the above description will apprise those skilled in the art of asphalt stocks acceptable for use in this invention.

Water is the continuous phase in the bituminous emulsions of this invention. In the water phase the bitumen, i.e., the asphalt, is present as discrete particles. The quantity of water employed is not critical and is selected so that a workable, stable emulsion is obtained. Those skilled in the art will have no difficulty in determining the exact amount of water to be used in preparing a particular emulsion. The emulsifier employed in preparing the bituminous emulsions for this invention is a water-soluble alkoxylated asphalt. The preparation of such alkoxylated asphalts is more completely described in U.S. Pat. No. 4,043,396 which is incorporated herein in its entirety. Any of the asphalt materials previously described may be alkoxylated by the method set out in U.S. Pat. No. 4,043,396.

The alkylene oxides suitable for reacting with the asphalts are ethylene oxide and propylene oxide or mixtures thereof so that the resulting alkoxylated asphalt is water soluble. Most preferably, ethylene oxide or a major amount of ethylene oxide and a minor amount of propylene oxide should be used. Useful alkoxylated asphalts include asphalts alkoxylated with from about 2 to about 100 weight percent of the alkylene oxide. In preparing such alkoxylated products the required quantity of asphalt, a minor amount of a powdered alkali metal hydroxides and a solvent sufficient to dissolve the asphalt such as toluene, xylene, etc. are charged to an autoclave. The autoclave temperature is raised to about 100° C. to about 200° C. and the required amount of the alkylene oxide is pressured with nitrogen into the autoclave. Usually the alkylene oxide is added in several incremental amounts. After all the alkylene oxide has been added, the autoclave and contents are generally maintained at the reaction temperature for about 1 hour after which the reactor is cooled and then purged with nitrogen. Evaporation of the solvents and stripping of the reaction mixture yields the ethoxylated asphalt product which is a dark viscous liquid.

A wide variety of silane type adhesion promoters may be employed in preparing the bituminous emulsions of this invention such as aminoalkoxy silanes as exemplified by di-t-butoxy-diaminosilane, methylhalosilanes, etc. An especially useful class of silane adhesion promoters includes compounds set out in U.S. Pat. No. 4,038,096 which have the formula

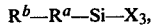

wherein
(a) X represents halogen, e.g. fluorine, chlorine, bromine and the like, preferably chlorine, or alkoxy containing 1 to 4 carbon atoms, e.g. methoxy, ethoxy, propoxy, isopropoxy, butoxy, isobutoxy, sec-butoxy, tert-butoxy;
(b) $R^a$ represents alkylene preferably containing 2 to 4 carbon atoms, e.g., ethylene, trimethylene, methylethylene, alpha-methyl trimethylene, beta-methyl trimethylene, tetramethylene, and the like;
(c) $R^b$ represents amino; aminoalkylene amino, preferably containing 1 to 3 carbon atoms, e.g. amino methylene amino, aminoethylene amino, aminotrimethylene amino, aminoethylethylene amino; gammaglycidoxy; hydrocarboxyl, preferably containing from 12 to 19 carbon atoms, e.g. dodecyl, tridecyl, tetradecyl, pentadecyl, hexadecyl, heptadecyl, actadecyl, nonadecyl, and the like; acyloxy, preferably containing 2 to 4 carbon atoms, e.g. ethanoyloxy, propanoloxy, butanoyloxy, 2-butenoyloxy, propanoyloxy, butanoyloxy, 2-butenoyloxy, methacryloxy, and the like; or mercapto.

The purpose of adding silanes as the art is well aware, is to prevent the stripping of the bitumen from the aggragate under water immersion.

As previously pointed out, the amount of the silane adhesion promoter in the bituminous surfacing compositions of this invention will range from about 0.001 parts to about 0.10 part by weight per 100 parts of the mineral aggragate. These silanes can be introduced into the bituminous surfacing compositions in a variety of ways such as by being added to the molten asphalt prior to the preparation of the emulsion and in such case the quantity of the silane added will be such that from 0.001 to about 1.0 percent by weight will be present in the bituminous emulsion.

The silane adhesion promoter when used, is present in the bituminous surfacing compositions in amounts ranging from about 0.0001 to 0.05 parts by weight and, preferably, from about 0.001 to about 0.02 parts by weight per 100 parts of the mineral aggregate.

In another method the aggregate such as the particulate slag, can be treated or coated with the silane before addition to the emulsion. Coating of the aggregate is accomplished by dissolving the silane in a suitable solvent which can be, for example, water, benzene, toluene, xylene, hexane, etc. The solution of the silane which can be heated, if desired, is then sprayed or otherwise dispersed onto the mass of the aggregate. Evaporation of the solvent yields the aggregate coated with the silane. The aggregate, such as the particulate slag, can be advantageously treated with the silane in a fluidized bed operation in which, for example, a solution of the silane of about 0.01 to about 1 weight percent or more in any of the previously mentioned solvents is introduced via a suitable nozzle onto a bed of, for example, particulate slag maintained in a fluidized state with nitrogen, or any other suitable fluidizing gas at a temperature of about 100° to about 180° F.

The preparation of the aggregate treated or coated with the silane adhesion promoter is illustrated in the following example.

Preparation of Silane-Coated Aggregate

A 2000 g amount of particulate slag is maintained in a fluidized state in the upper chamber of a cylindrical vessel having an upper chamber and a lower chamber divided by a horizontally situated gas-pervious partition. Nitrogen, which is the fluidizing gas, at a temperature of 150° F. is introduced into the lower chamber under pressure and passes upwardly through the gas-pervious partition thus forming the fluidized bed of the particulate slag. The vessel is also equipped with a spray head located about 6 inches above the top of the fluidized bed which is connected by tubing to a silane solution tank located outside the cylindrical vessel. Through the spray heat there is introduced at the rate of 800 cc. per hour onto the fluidized bed a total of 0.1 g of aminoethyleneaminopropyl trimethoxy silane as a 0.02 weight percent solution of the silane in toluene. The residual concentration of silane on the particulate slag is about 0.001 weight percent.

The following example illustrates the preparation of the bituminous emulsions and the bitminous surfacing compositions of this invention and is to be considered not limitative.

EXAMPLE I

An emulsion is prepared by vigorously agitating in a colloid mill steam refined asphalt (68 weight percent), 3.0 weight percent of an asphalt emulsifier ethoxylated with 82 weight percent of ethylene oxide prepared in the manner previously described by ethoxylating an asphalt derived from a lubricating oil deasphalting operation having a melting point of 215°–300° F. which was air blown at 500° F. prior to alkoxylation resulting in a hydroxyl number of 35, and 29 weight percent water.

A surfacing composition is prepared using about 10 parts of the above emulsion per 100 parts of the previously prepared particulate slag aggregate having a residual concentration of aminoethyleneaminopropyl trimethoxy silane. Portions of the prepared surfacing compositions are cured and after being tested under various water immersion conditions it is found that these compositions exhibit excellent resistance to stripping while immersed in water at the elevated temperatures.

What is claimed is:

1. A surfacing composition comprising
    (a) 100 parts by weight of a mineral aggregate,
    (b) the residuum of from 3 to 150 parts by weight of an asphalt emulsion comprising: (A) about 40 to about 85 percent by weight of asphalt, (B) from about 0.5 to about 10.0 percent by weight of a water-soluble alkoxylated asphalt emulsifier and (C) water to make 100 percent by weight of the emulsion and wherein the said aggregate is treated with a silane adhesion promoter in an amount such that a residual concentration of the said silane on the aggregate is about 0.001 to about 0.02 weight percent.

2. The surfacing composition of claim 1 wherein the said aggregate is particulate slag.

3. The surfacing composition of claim 1 wherein the said silane is selected from the group consisting of β-aminoethyl-γ-aminopropyl trimethyoxysilane and γ-aminopropyl triethoxysilane.

4. The surfacing composition of claim 1 wherein the said alkoxylated asphalt emulsifier is asphalt ethoxylated with a material selected from the group consisting of ethylene oxide and mixtures of ethylene and propylene oxides wherein the weight percent of ethylene oxide in the said mixtures is about 60 to about 95.

5. A bituminous emulsion comprising
    (a) 40 to 85 percent by weight of a bituminous binder
    (b) from about 0.1 to about 10 percent by weight of a water-soluble ethoxylated asphalt emulsifier, and
    (c) water to make 100 percent by weight of the emulsion.

6. The emulsion of claim 5 wherein the said alkoxylated asphalt is asphalt ethoxylated with from 2 to about 100 weight percent of a material selected from the group consisting of ethylene oxide and mixtures of ethylene and propylene oxides wherein the weight percent of ethylene oxide in the said mixture is about 60 to about 95.

7. The emulsion of claim 5 wherein the said emulsion contains about 0.001 to about 1.0 weight percent of a silane adhesion promoter.

* * * * *